US007180827B2

(12) United States Patent
Luc et al.

(10) Patent No.: US 7,180,827 B2
(45) Date of Patent: Feb. 20, 2007

(54) SURFACE ACOUSTIC ANTENNA FOR SUBMARINES

(75) Inventors: François Luc, Vallauris (FR); Eric Sernit, Mouans-Sartoux (FR)

(73) Assignee: Thales, Neuilly sur Seine (FR)

( * ) Notice: Subject to any disclaimer, the term of this patent is extended or adjusted under 35 U.S.C. 154(b) by 199 days.

(21) Appl. No.: 10/503,973

(22) PCT Filed: Feb. 14, 2003

(86) PCT No.: PCT/FR03/00488

§ 371 (c)(1), (2), (4) Date: Aug. 10, 2004

(87) PCT Pub. No.: WO03/069594

PCT Pub. Date: Aug. 21, 2003

(65) Prior Publication Data

US 2005/0157590 A1 Jul. 21, 2005

(30) Foreign Application Priority Data

Feb. 15, 2002 (FR) .................................. 02 01940

(51) Int. Cl.
*G01K 11/00* (2006.01)

(52) U.S. Cl. ...................................................... 367/141

(58) Field of Classification Search ................ 367/141, 367/153, 154
See application file for complete search history.

(56) References Cited

U.S. PATENT DOCUMENTS

| | | | | |
|---|---|---|---|---|
| 4,974,213 | A | 11/1990 | Siwescki | |
| 5,517,467 | A * | 5/1996 | Fromont et al. | 367/155 |
| 6,341,661 | B1 * | 1/2002 | Bick et al. | 181/110 |

FOREIGN PATENT DOCUMENTS

| | | | |
|---|---|---|---|
| FR | 2685848 | A | 7/1993 |
| FR | 2691596 | A | 11/1993 |
| GB | 2130844 | A | 6/1984 |

* cited by examiner

*Primary Examiner*—Dan Pihulic
(74) *Attorney, Agent, or Firm*—Lowe Hauptman & Berner, LLP

(57) ABSTRACT

The invention relates to surface acoustic antennas for submarines. It consists, in a known antenna, in replacing certain pressure sensors with velocity sensors in order to obtain cardioid directivity with a zero oriented toward the hull of the submarine. It allows the use of baffles serving to attenuate the noise generated inside the submarine.

19 Claims, 3 Drawing Sheets

SURFACE ACOUSTIC ANTENNA FOR SUBMARINES

CROSS-REFERENCE TO RELATED APPLICATIONS

The present Application is based on International Application No. PCT/FR03/00488, filed on Feb. 14, 2003, entitled "SURFACE ACOUSTIC ANTENNA FOR SUBMARTNES", which in turn corresponds to FR 02/01940 filed on Feb. 15, 2002, and priority is hereby claimed under 35 USC §119 based on these applications. Each of these applications are hereby incorporated by reference in their entirety into this application.

FIELD OF THE INVENTION

The present invention relates to acoustic antennas for receiving low-frequency submarine waves. It relates more particularly to what are called surface antennas, the sensors of which are in the form of piezoelectric films generally made of PVDF (polyvinylidene fluoride).

BACKGROUND OF THE INVENTION

It is known to place such receiving antennas on the flanks of submarines. Their area is up to several square meters and they are called "flank arrays". In French patent No. 92/06279 filed on May 27, 1992, published on Nov. 26, 1992 under No. 2 691 596 and granted on Apr. 28, 1995, the Applicant described a flank array composed of several rectangular panels matching the convex shape of the flank of the submarine. Referring to FIG. 2*a* of that patent, the panels are mounted on two rails 3, 4 so that the panels are not in contact with the hull, a sheet of water separating the panels from the hull. Thus, the transmission of flexure waves from the hull to the sensor is limited.

However, vibrations and resonances of the hull and of the ancillary structures of the submarine (especially those emanating from the machinery) continue to pass through the rails.

In addition, since the directivity of the sensors is, in open water, omnidirectional (they are short compared with the central wavelength of the listening frequency band), the hull cannot be clad with a low-acoustic-impedance baffle that would improve the acoustic stealth of the submarine, since the directivity would then be variable and not controllable.

To alleviate these drawbacks, the invention proposes to combine particle velocity sensors with the pressure sensors so that each receiving panel is directional.

To alleviate these drawbacks, the invention proposes a surface acoustic antenna, of the type comprising an array of plane pressure sensors made of a piezoelectric plastic that are fixed so as to be planar in a support structure, mainly characterized in that certain of these sensors are replaced with particle velocity sensors placed in such a way that the combination of the signal from the pressure sensors and the signal from the velocity sensors is used to obtain a cardioid having a zero for reception normal to one of the faces of the antenna.

SUMMARY OF THE INVENTION

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

According to another feature, the particle velocity sensors are formed from geophones encapsulated in a mass of syntactic foam, the density of which is the same as that of the encapsulation material for encapsulating all the sensors of the antenna.

According to another feature, the plane pressure sensors are joined together by connection bridges that are curved in the form of a V in order to form channels for keeping the connection wires for the particle velocity sensors in place during the operations for molding the antenna system.

According to another feature, the surface comprising the array of sensors substantially forms a plane shaped to the surface of the hull of a carrier ship and the zero of the cardioid is directed toward said hull.

According to another feature, the carrier ship is a submarine.

According to another feature, the antenna comprises at least one panel consisting of fifteen pressure sensors and six velocity sensors regularly interspersed among these pressure sensors.

BRIEF DESCRIPTION OF THE DRAWINGS

Other features and advantages of the invention will become clearly apparent from the description that follows, with regard to the appended figures which represent.

DESCRIPTION OF THE PREFERRED EMBODIMENT

According to the invention, a surface acoustic antenna for submarines as described in French patent No. 2 691 596 is essentially characterized in that each panel comprises particle velocity sensors whose sensitivity axis is normal to the plane of the panel and in that the corresponding center of phase is coincident with the center of phase of the pressure sensors, thus making it possible to obtain cardioid directivity.

Figure 1:
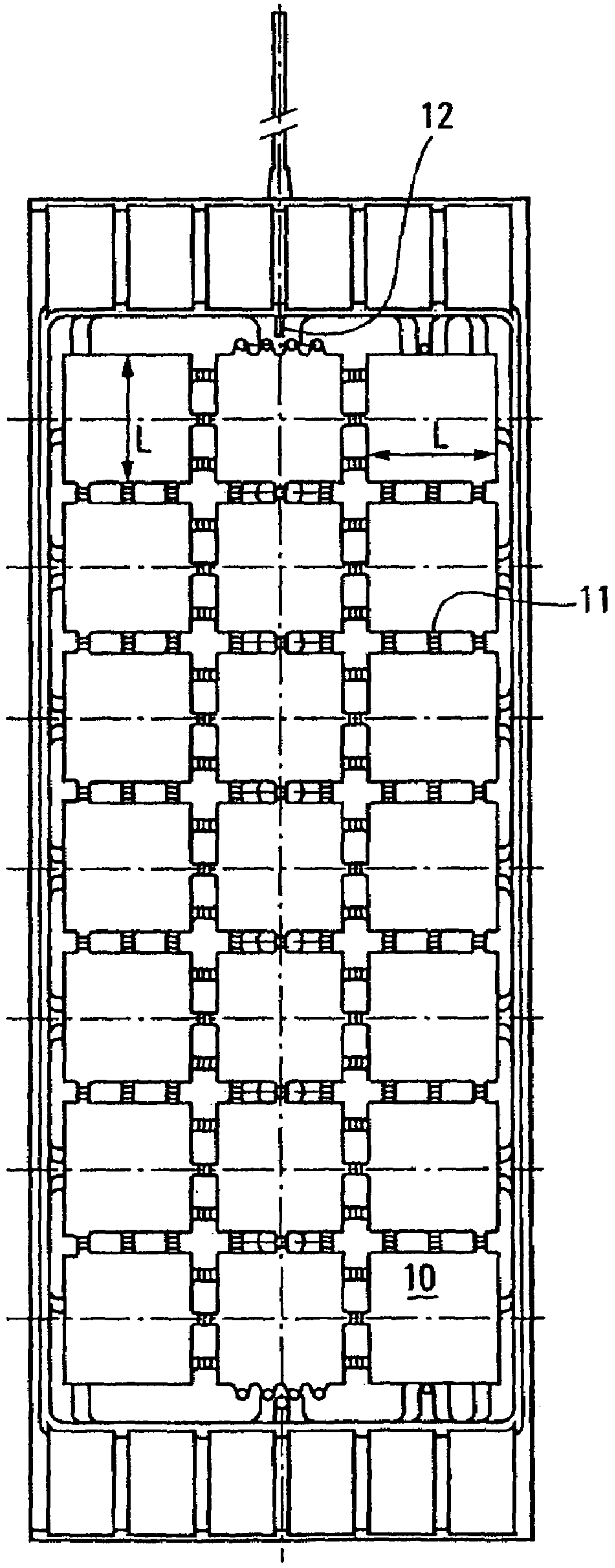
PRIOR ART Fig. 1
FIG. 1, a plane sectional view of the panels of an antenna according to the prior art.
Figure 5:
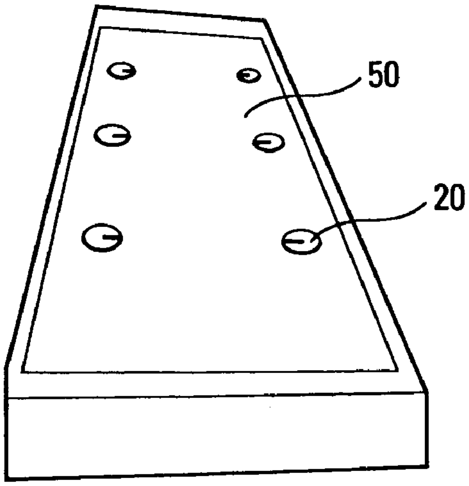

FIG. 1 shows a view of the pressure sensors located within a panel according to the prior art and it corresponds to FIG. 5 of French patent No. 2 691 596. It will be recalled that the pressure sensor has a bimorph structure, that is to say it is formed from two layers of PVDF piezoelectric film separated by a central electrode forming the hot spot. The two layers are covered with two outer electrodes that are electrically connected to form the cold spot.

Thus, the view shown in FIG. 1 is a plane cross section through the panel level with the central or outer electrodes.

Each electrode is formed from a set of square plates 10 joined together by narrow bridges 11. The two connections 12 for the output signal are located at one end of the array.

Figure 2:
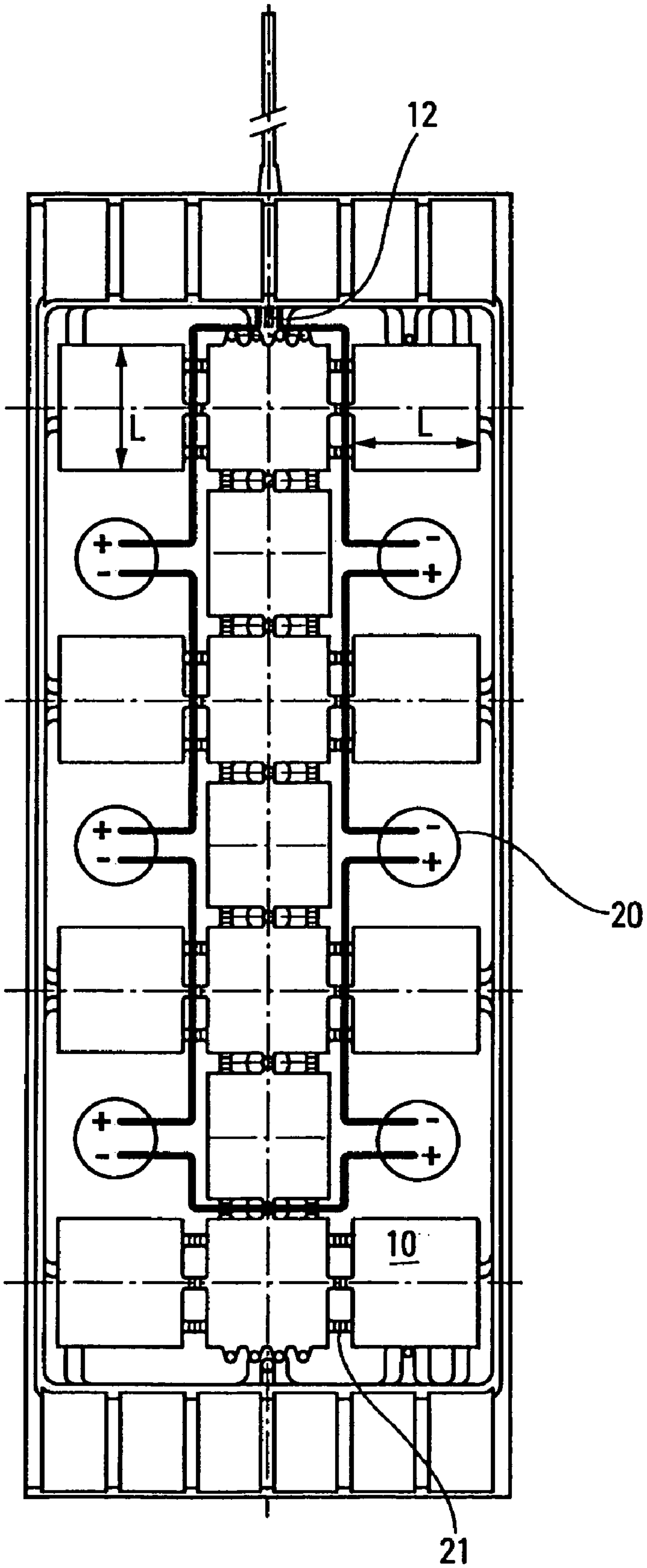
FIG. 2, a view under the same conditions of an antenna according to the invention.

FIG. 2 shows a view of the modified panel according to the invention, in the same cross section as that of FIG. 1. Velocity sensors 20 are placed at selected locations in order to bring into coincidence the two centers of phase corresponding to the two signals measuring the pressure and the velocity component normal to the panel. This result is obtained geometrically using the symmetry of the locations where the measurements are made.

In the embodiment example shown in FIG. 2, six of the twenty-one pressure sensors 20 have been removed and six velocity sensors 20 have been placed at the center of the spaces thus left.

Figure 3:
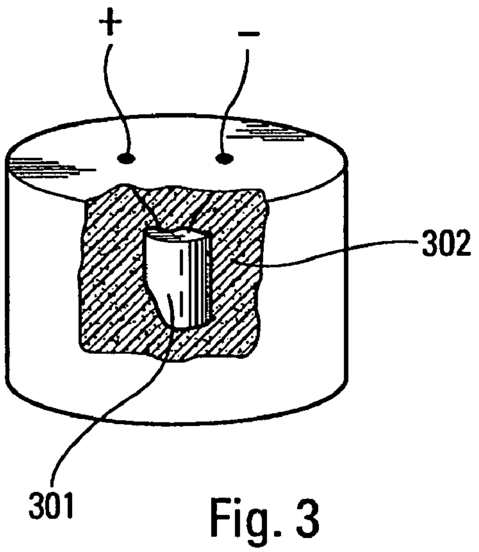
FIG. 3, a perspective view of a geophone used in an antenna according to the invention.

According to a preferred embodiment, shown schematically in FIG. 3, the velocity sensors are geophones 301 encapsulated in a syntactic foam 302 having the same density as the encapsulating polyurethane in which the pressure sensors are molded, as described in French patent 2 691 596.

Figure 4:
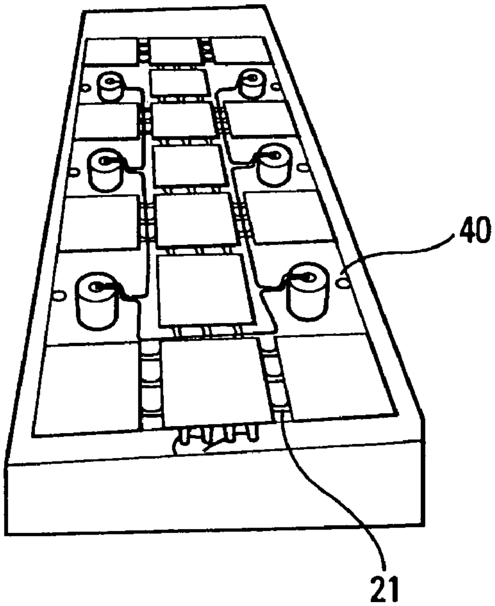
FIGS. 4 and 5, perspective views of a panel according to the invention before and after molding.

The series cabling of the geophones is indicated in FIG. 2 and has no particular features except that the bridges 21 are V-shaped so as to form a channel for reducing the movement of the cables during the molding operation, as may also be clearly seen in FIG. 4.

Coming into the connector 12 are two wires for the omnidirectional pressure signal output by the panels 10 and two wires for the velocity signal output by the sensors 20. The directivity of the signal from the sensors 20 is as cos?, where ? is the angle of incidence of the wave relative to the sensitivity axis of the sensor. As is widely known, the addition of these two signals provides a signal whose directivity is in the form of a cardioid, with the "zero" direction normal to the panel and oriented rearward, and therefore toward the hull.

This thus results in strong rejection of the waves coming from the rear and in hydrophone sensitivity independent of the support to which the antenna is fixed. This support may therefore be a matched baffle. Experiments have shown that it is possible to achieve a gain of around 10 dB in terms of rejection of noise specifically of mechanical origin.

FIG. 4 shows, in a perspective view, a panel according to the invention before molding and FIG. 5 shows such a panel after molding, after a suitable polyurethane material 50 has been poured in, the level of which comes flush with the upper part of the geophones. To complete the panel, a layer of neoprene having a composition identical to that of the surround 40 is cast on top.

The panel thus obtained can be installed directly on the hull of the submarine, or else on a material with a low acoustic impedance deposited on the hull, which thus improves the acoustic stealth of the submarine.

Without departing from the scope of the invention, the geophones may be replaced with accelerometers or any other directional sensor.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A surface acoustic antenna placed on a flank of a carrier ship having a hull, comprising:

an array of plane pressure sensors made of a piezoelectric plastic that are fixed so as to be planar in a support structure, wherein certain of these sensors are particle velocity sensors placed so that the center of phase of the velocity sensors coincides with that of the pressure sensors, the signal output by the pressure sensors and that output by the velocity sensors being combined so as to achieve rejection of the acoustic waves via that face of the antenna facing the hull of the carrier ship.

2. The antenna as claimed in claim 1, wherein the particle velocity sensors are formed from geophones encapsulated in a mass of syntactic foam, the density of which is the same as that of the encapsulation material for encapsulating all the sensors of the antenna.

3. The antenna as claimed in claim 1, wherein the plane pressure sensors are joined together by connection bridges that are curved in the form of a V in order to form channels for keeping the connection wires for the particle velocity sensors in place during the operations for molding the antenna system.

4. The antenna as claimed in claim 1, wherein the surface comprising the array of sensors substantially forms a plane shaped to the surface of the hull of a carrier ship, the combination of pressure sensors and velocity sensors forming a cardioid shaved diagram with zero a reception directed toward the hull of the carrier ship.

5. The antenna as claimed in claim 4, wherein the carrier ship is a submarine.

6. The antenna as claimed in claim 1, comprising at least one panel consisting of fifteen pressure sensors and six velocity sensors regularly interspersed among these pressure sensors.

7. The antenna as claimed in claim 2, wherein the plane pressure sensors are joined together by connection bridges that are curved in the form of a V in order to form channels for keeping the connection wires for the particle velocity sensors in place during the operations for molding the antenna system.

8. The antenna as claimed in claim 2, wherein the surface comprising the array of sensors substantially forms a plane shaped to the surface of the hull of a carrier ship, the combination of pressure sensors and velocity sensors forming a cardioid shaped diagram wit a zero reception directed toward said hull.

9. The antenna as claimed in claim 3, wherein the surface comprising the array of sensors substantially forms a plane shaped to the surface of the hull of a carrier ship, the combination of pressure sensors and velocity sensors forming a cardioid shaped diagram wit a zero reception directed toward said hull.

10. The antenna as claimed in claim 2, comprising at least one panel consisting of fifteen pressure sensors and six velocity sensors regularly interspersed among these pressure sensors.

11. The antenna as claimed in claim 3, comprising at least one panel consisting of fifteen pressure sensors and six velocity sensors regularly interspersed among these pressure sensors.

12. The antenna as claimed in claim 4, comprising at least one panel consisting of fifteen pressure sensors and six velocity sensors regularly interspersed among these pressure sensors.

13. The antenna as claimed in claim 5, comprising at least one panel consisting of fifteen pressure sensors and six velocity sensors regularly interspersed among these pressure sensors.

14. A retrofit kit for a purpose acoustic antenna placed on a flunk of a carrier ship having a hull, said antenna including an array of plane sensors made of a piezoelectric plastic that are fixed so as to be planar in a support structure said retrofit kit comprising one or more plastic velocity sensors to replace some of said array of plane sensors placed so that the center of phase of the velocity sensors coincides with that of the pressure sensors, the signal output by the pressure sensors and that output by the velocity sensors being combined so as to achieve rejection of the acoustic waves via tat face of the antenna facing the hull of the carrier ship.

15. The antenna as claimed in claim 14, wherein the particle velocity sensors are formed from geophones encapsulated in a mass of syntactic foam, the density of which is the same as that of the encapsulation material for encapsulating all the sensors of the antenna.

16. The antenna as claimed in claim 14, wherein the surface comprising the array of sensors substantially forms a plane shaped to the surface of the hull of a carrier ship, the combination of pressure sensors forming a cardioid shaped diagram with a zero reception directed toward said hull.

17. The antenna as claimed in claim 14, wherein the cater ship is a submarine.

18. The antenna as claimed in claim 14, a comprising at least one panel consisting of fifteen pressure sensors and six velocity sensors regularly interspersed among these pressure sensors.

19. The antenna as claimed in claim 14, wherein the particle velocity sensors are formed from geophones encapsulated in a mass of syntactic foam, the density of which is the same as that of the encapsulation material for encapsulating all the sensors of the antenna.

* * * * *